US008626359B2

(12) United States Patent
Andrews

(10) Patent No.: US 8,626,359 B2
(45) Date of Patent: Jan. 7, 2014

(54) IMPLEMENTATION OF KALMAN FILTER LINEAR STATE ESTIMATOR FOR ACTUATOR EQUALIZATION

(75) Inventor: Joseph John Andrews, Hamden, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 83 days.

(21) Appl. No.: 13/226,188

(22) Filed: Sep. 6, 2011

(65) Prior Publication Data

US 2012/0116612 A1 May 10, 2012

Related U.S. Application Data

(60) Provisional application No. 61/410,525, filed on Nov. 5, 2010.

(51) Int. Cl.
*B64C 27/615* (2006.01)
*B64C 27/72* (2006.01)
*G05D 1/08* (2006.01)

(52) U.S. Cl.
CPC .............. B64C 27/615 (2013.01); B64C 27/72 (2013.01); G05D 1/0858 (2013.01); *Y02T 50/34* (2013.01); *B64C 2027/7266* (2013.01)
USPC .............................. 701/3; 700/280; 244/17.13

(58) Field of Classification Search
CPC ........... B64C 27/72; B64C 2027/7266; G05D 1/0858; Y02T 50/34
USPC ............................................................ 701/3
See application file for complete search history.

(56) References Cited

U.S. PATENT DOCUMENTS

| | | | |
|---|---|---|---|
| 3,647,315 | A | 3/1972 | Rostad et al. |
| 6,030,177 | A | 2/2000 | Hager |
| 6,113,034 | A | 9/2000 | Basuthakur et al. |
| 6,229,898 | B1 | 5/2001 | Goodman |

(Continued)

FOREIGN PATENT DOCUMENTS

| | | |
|---|---|---|
| EP | 1175339 B1 | 2/2004 |
| WO | 0063073 A1 | 10/2000 |

(Continued)

OTHER PUBLICATIONS

Crozier et al., "Wind-tunnel tests of a helicopter rotor with active flaps", 32nd European Rotorcraft Forum (ERF 2006), Sep. 2006, pp. 1-16.*

(Continued)

*Primary Examiner* — James Trammell
*Assistant Examiner* — Todd Melton
(74) *Attorney, Agent, or Firm* — Cantor Colburn LLP

(57) ABSTRACT

A rotorcraft control system is provided and includes a rotor blade having a moving surface operatively connected for movement among various positions, an actuator receptive of a modified control signal and operatively connected to move the surface among the various positions, a sensor operably coupled to the actuator to generate a sensor response signal reflective of a response of the actuator to the modified control signal and a controller to output the modified control signal to the actuator, the controller including a control loop to generate the modified control signal from an initial control signal that is modified by relating the initial control signal and the sensor response signal and by accounting for actuator inaccuracies, sensor sensitivities and noise.

16 Claims, 3 Drawing Sheets

(56) References Cited

U.S. PATENT DOCUMENTS

| | | |
|---|---|---|
| 6,273,681 B1 | 8/2001 | Yamakawa et al. |
| 6,295,006 B1 | 9/2001 | Kohlhepp |
| 6,322,324 B1 | 11/2001 | Kennedy et al. |
| 6,345,792 B2 | 2/2002 | Bilanin et al. |
| 6,354,536 B1 | 3/2002 | Torok et al. |
| 6,371,415 B1 | 4/2002 | Lorkowski et al. |
| 6,425,553 B1 | 7/2002 | Smith et al. |
| 6,453,669 B2 | 9/2002 | Kennedy et al. |
| 6,467,732 B2 | 10/2002 | Tsukahara et al. |
| 6,499,690 B1 | 12/2002 | Katayama et al. |
| 6,644,919 B2 | 11/2003 | Bauer et al. |
| 6,984,109 B2 | 1/2006 | Bagai |
| 7,003,380 B2 | 2/2006 | MacMartin et al. |
| 7,421,343 B2 | 9/2008 | Hawkinson |
| 7,424,988 B2 | 9/2008 | McDonnell |
| 7,644,887 B2 | 1/2010 | Johnson et al. |
| 7,677,868 B2 | 3/2010 | Chaudhry et al. |
| 7,748,958 B2 | 7/2010 | McVeigh et al. |
| 7,900,869 B2 | 3/2011 | Keβler |
| 2005/0123400 A1 | 6/2005 | Bagai |
| 2007/0131820 A1 | 6/2007 | Chaudhry et al. |
| 2008/0101931 A1 | 5/2008 | Chaudhry et al. |
| 2008/0138203 A1 | 6/2008 | Collins et al. |
| 2008/0145220 A1 | 6/2008 | Yeh et al. |
| 2008/0145221 A1 | 6/2008 | Sun et al. |

FOREIGN PATENT DOCUMENTS

| | | |
|---|---|---|
| WO | 2008147450 A1 | 12/2008 |
| WO | 2008147462 A2 | 12/2008 |
| WO | 2009085352 A1 | 7/2009 |

OTHER PUBLICATIONS

Uwe T.P. Arnold, Closed Loop IBC Results From CH-53G Flight Tests, Aerospace Science and Technology 9, 2005, pp. 421-435.

Extended European Search Report, EP11180020, issued Apr. 5, 2013, 8 pgs.

* cited by examiner

IMPLEMENTATION OF KALMAN FILTER LINEAR STATE ESTIMATOR FOR ACTUATOR EQUALIZATION

CROSS-REFERENCE TO RELATED APPLICATION

This application claims the benefit of priority to U.S. Provisional Application No. 61/410,525, entitled, "IMPLEMENTATION OF KALMAN FILTER LINEAR STATE ESTIMATOR FOR ACTUATOR EQUALIZATION," which was filed on Nov. 5, 2010, the entire contents of which are incorporated herein by reference.

FEDERAL RESEARCH STATEMENT

This invention was made with Government support under Agreement No. W911W6-08-2-0004 for High Performance, Low Vibration and Low Noise. The Government has certain rights in the invention.

BACKGROUND OF THE INVENTION

The subject matter disclosed herein relates to rotorcraft control systems and, more particularly, to rotorcraft control systems in which trailing-edge flaps are actively controlled. The invention herein does not limit itself to flaps and has applications with any active system with actuators and feedback in the rotating system of a helicopter, such as, but not limited to, flaps, slats, individual blade control, MiTEs, blowing, and flex surfaces.

Rotorcraft, such as, but not limited to, helicopters have included control systems using a swashplate for effectuating primary flight control. Although simple to implement, the swashplate control system suffers from several shortcomings, including large drag forces which significantly reduce energy efficiency, lack of higher harmonic control capability, and insufficient system redundancy. Trailing-edge flaps have, therefore, been used for purposes of higher harmonic control, that is, for reduction of noise and vibration. These flaps, often termed "active flaps," are located on the trailing edges of rotor blades and have typically been driven by electromechanical actuators or solenoids.

Typically, active flap control has been achieved by way of analog control signals sent to the electromechanical actuators or solenoids. This analog control, however, been observed to lead to a lag in the response times along with underperformance of the electromechanical actuators or solenoids from the commanded/desired, including amplitude and waveform. These response differences among the actuators cause the active flap control to be unsuitable in the presence of external forces and needs to be corrected.

BRIEF DESCRIPTION OF THE INVENTION

According to one aspect of the invention, a rotorcraft control system is provided and includes a rotor blade having a moving surface operatively connected for movement among various positions, an actuator receptive of a modified control signal and operatively connected to move the surface among the various positions, a sensor operably coupled to the actuator to generate a sensor response signal reflective of a response of the actuator to the modified control signal and a controller to output the modified control signal to the actuator, the controller including a control loop to generate the modified control signal from an initial control signal that is modified by relating the initial control signal and the sensor response signal and by accounting for actuator inaccuracies, sensor sensitivities and noise.

According to another aspect of the invention, a rotorcraft control system is provided and includes a rotor blade having a moving surface operatively connected for movement among various positions, an actuator receptive of a modified control signal and operatively connected to move the surface among the various positions, a sensor operably coupled to the actuator to generate a signal reflective of a response of the actuator to the modified control signal, a harmonic estimator, which is receptive of the signal reflective of the actuator response and configured to generate a harmonic sensor response signal accordingly and a controller to output the modified control signal to the actuator, the controller including a control loop to generate the modified control signal from an initial control signal that is modified by relating the initial control signal and the harmonic sensor response signal and by accounting for actuator inaccuracies, sensor sensitivities and noise.

According to another aspect of the invention, a method of operating a controller of a rotorcraft is provided and includes outputting a modified control signal to an actuator for moving a moving surface on a rotor blade, sensing an actuator response to the modified control signal while accounting for actuator inaccuracies, sensor sensitivity to noise and external forces, generating an actuator response signal from the sensed actuator response, converting the actuator response signal into a harmonic sensor response signal and generating the modified control signal by modifying an initial control signal in accordance with values obtained from the harmonic sensor response signal.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
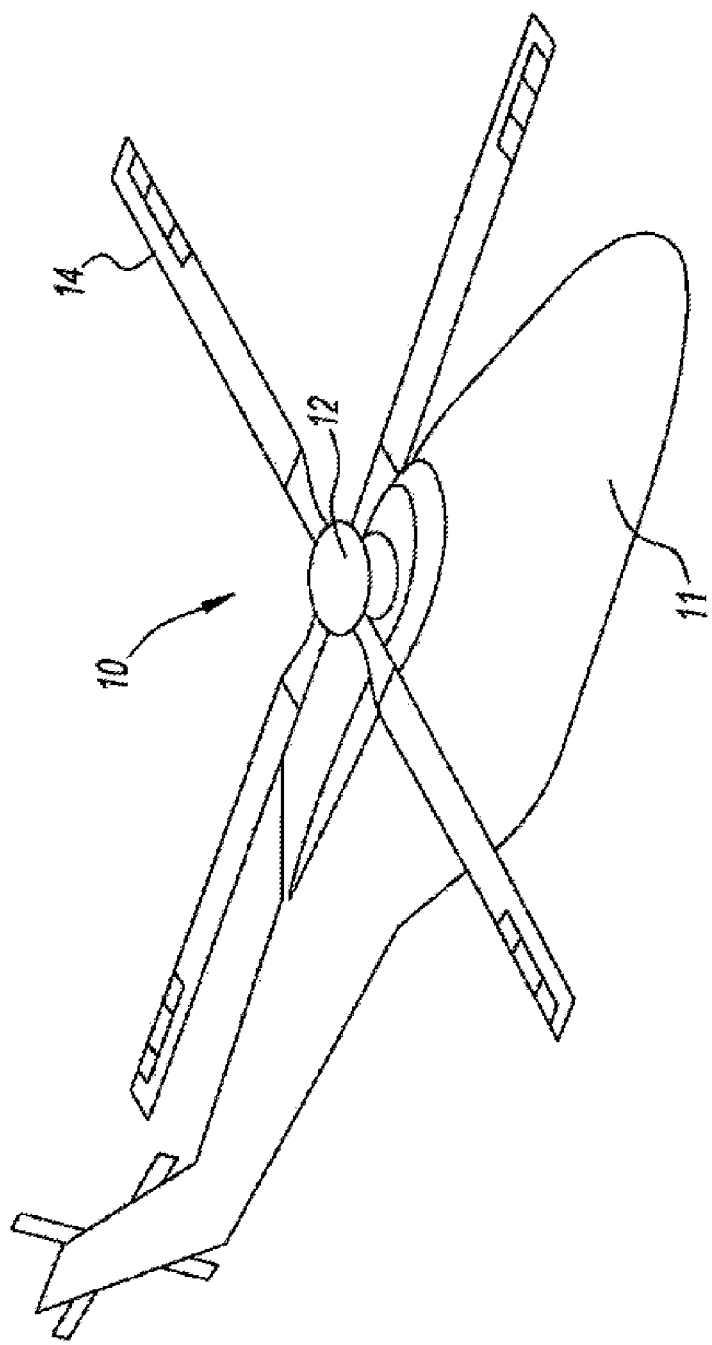
FIG. 1 is a perspective view of an exemplary embodiment of a rotorcraft.
Figure 3A:
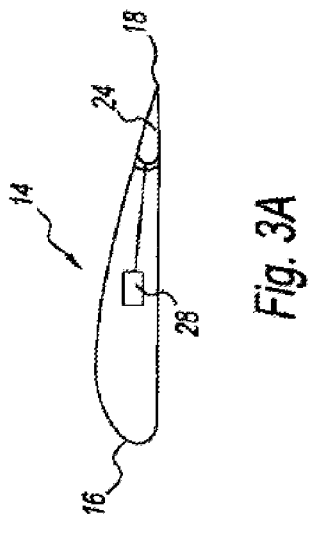
FIGS. 3A, 3B and 3C are cross-sectional views of the rotor blade of FIG. 2 taken along lines 3-3 showing flaps in a neutral position, a positive position and a negative position, respectively.

FIG. 1 schematically illustrates an exemplary embodiment of a rotorcraft control system 10 connected to a rotorcraft body 11 (i.e., an airframe). The control system 10 includes a rotor assembly 12 and at least two or more rotor blades 14 (four shown). For purposes of clarity, the control system 10 is illustrated in use with an exemplary helicopter although it is to be understood that the description provided below is applicable to other rotorcraft as well. Additionally, it is to be understood that the control system 10 may be incorporated into other aircraft as well, such as, for example, compound rotary-wing aircraft having a dual counter-rotating, coaxial rotor system, turbo-prop aircraft, tilt-rotor aircraft, tilt wing aircraft and the like.

The control system 10 is a trailing-edge flap system capable of both primary flight control (PFC) and higher harmonic control (HHC). PFC relates to the lift of the rotorcraft that results in the vertical and translational movement of the rotorcraft through the magnitude and tilt of the rotor thrust. HHC relates to changing the individual orientation (i.e. pitch) of the blades at higher harmonics as it rotates to improve rotor performance, such as reducing the overall noise and vibration of the rotorcraft.

Figure 2:
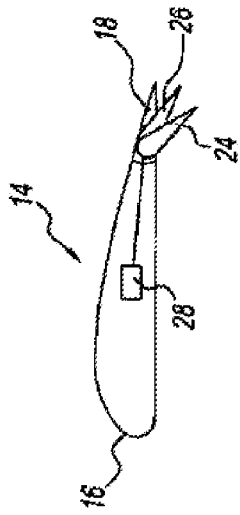
FIG. 2 is a top view of a rotor blade of FIG. 1.

The operation of control system 10 is described with reference to FIGS. 2, 3A, 3B and 3C. As shown, the rotor blade 14 has a leading edge 16, a trailing edge 18, a root end 20, and a tip 22. The leading edge 16 is the forward-facing edge of the rotor blade 14 as the rotor blade rotates through azimuth, A, in the direction of rotation, D, while the trailing edge 18 is the rear-facing edge of the rotor blade 14 as the rotor blade rotates through azimuth, A. The rotor blade 14 also has a chord length, c, which is defined as the distance between the leading edge 16 and the trailing edge 18, as shown in FIG. 2. The rotor blade 14 also has a span, R, which is defined as the distance between the root end 20 and the tip 22.

Each rotor blade 14 has one or more moving surfaces, such as trailing edge devices (flaps, MitTEs and flex surfaces), leading edge devices (active slats, blowing devices and flex surfaces) and rotor devices for individual blade control and active head VIB reduction. For example, each rotor blade 14 has primary flaps 24 (only two shown). The primary flaps 24 are operatively connected to the rotor blade 14 so that the primary flaps 24 rotate about an axis parallel to the span R. The primary flaps 24 are pivotally connected to the rotor blade 14. When the control system 10 includes more than one primary flap 24, each primary flap 24 may be selected and independently rotated. In addition, the control system 10 may selectively and independently rotate the primary flap 24 or flaps 24 on different rotor blades 14.

Figure 3C:
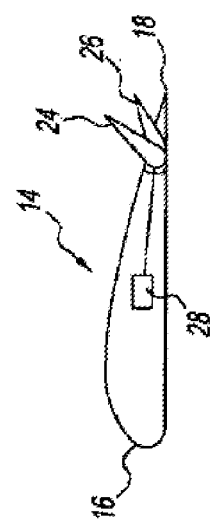
Figure 3B:
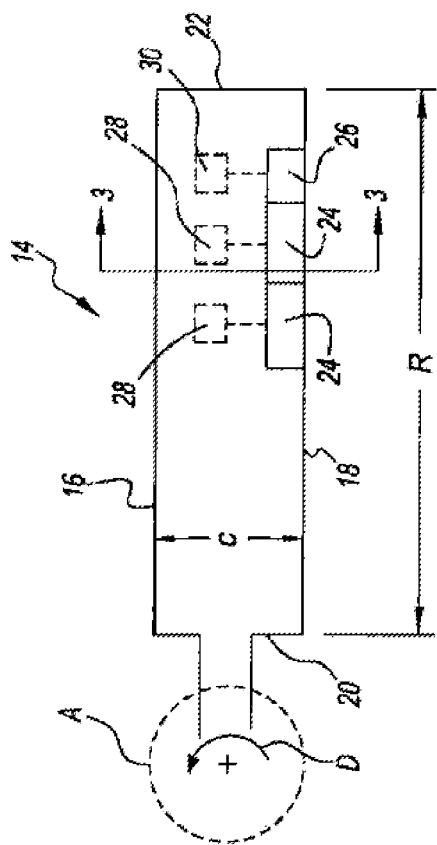

Each primary flap 24 can be rotated from a neutral position to either a positive position or a negative position. As used herein, the neutral position is defined as a position where the trailing-edge of the flap 24 is substantially parallel to the trailing edge 18 of the rotor blade (FIG. 3A), the positive position is defined as a position where the trailing edge of the flap 24 is above the trailing edge 18 of the rotor blade (FIG. 3B), and the negative position is defined as a position where the trailing edge of the flap 24 is below the trailing edge 18 of the rotor blade (FIG. 3C).

Each primary flap 24 is operatively connected to a primary actuator 28 that interfaces with and controls the movement of the primary actuator 28. The primary actuator 28 can be any actuator having sufficient power density and bandwidth to move the trailing edge of each of the primary flaps 24 as necessary. In some embodiments, the primary actuator 28 is an electromechanical actuator and, in further embodiments, the primary actuator 28 is a brushless direct current motor (BLDC motor) based actuator. In addition, each primary actuator 28 has sufficient stroke to move the primary flap 24 to positive and negative positions that are sufficient to provide primary flight control to the rotorcraft. Thus, the control system 10 can use the primary flaps 24 for primary flight control (PFC) of the rotorcraft.

The moving surfaces may also be secondary flaps in which case each rotor blade 14 also has one or more secondary flaps 26 (only one shown) operatively connected to the rotor blade 14 so that the secondary flap 26 can be rotated about an axis parallel to the span R. The secondary flaps 26 are pivotally connected to the rotor blade 14. When the control system 10 includes more than one secondary flap 26, each secondary flap 26 may be selectively and independently rotated. In addition, the control system 10 may selectively and independently rotate the secondary flap or flaps 26 on different rotor blades 14. The secondary flap 26 can also be rotated from the neutral position to either the positive or the negative position.

The secondary flap 26 is operatively connected to a secondary actuator 30 that interfaces with and controls the movement of the secondary flap 26. In some embodiments, the secondary actuator 30 may be an electromechanical actuator with high power density and bandwidth and, in further embodiments, the secondary actuator 30 may be a BLDC motor based actuator. In addition, the secondary actuator 30 has sufficient stroke to move the secondary flap 26 to positive and negative positions that are sufficient to provide at least higher harmonic control to the rotorcraft. Thus, the control system 10 can use the secondary flaps 26 to reduce noise and vibration of the rotorcraft, more specifically, for higher harmonic control (HHC).

Figure 4:
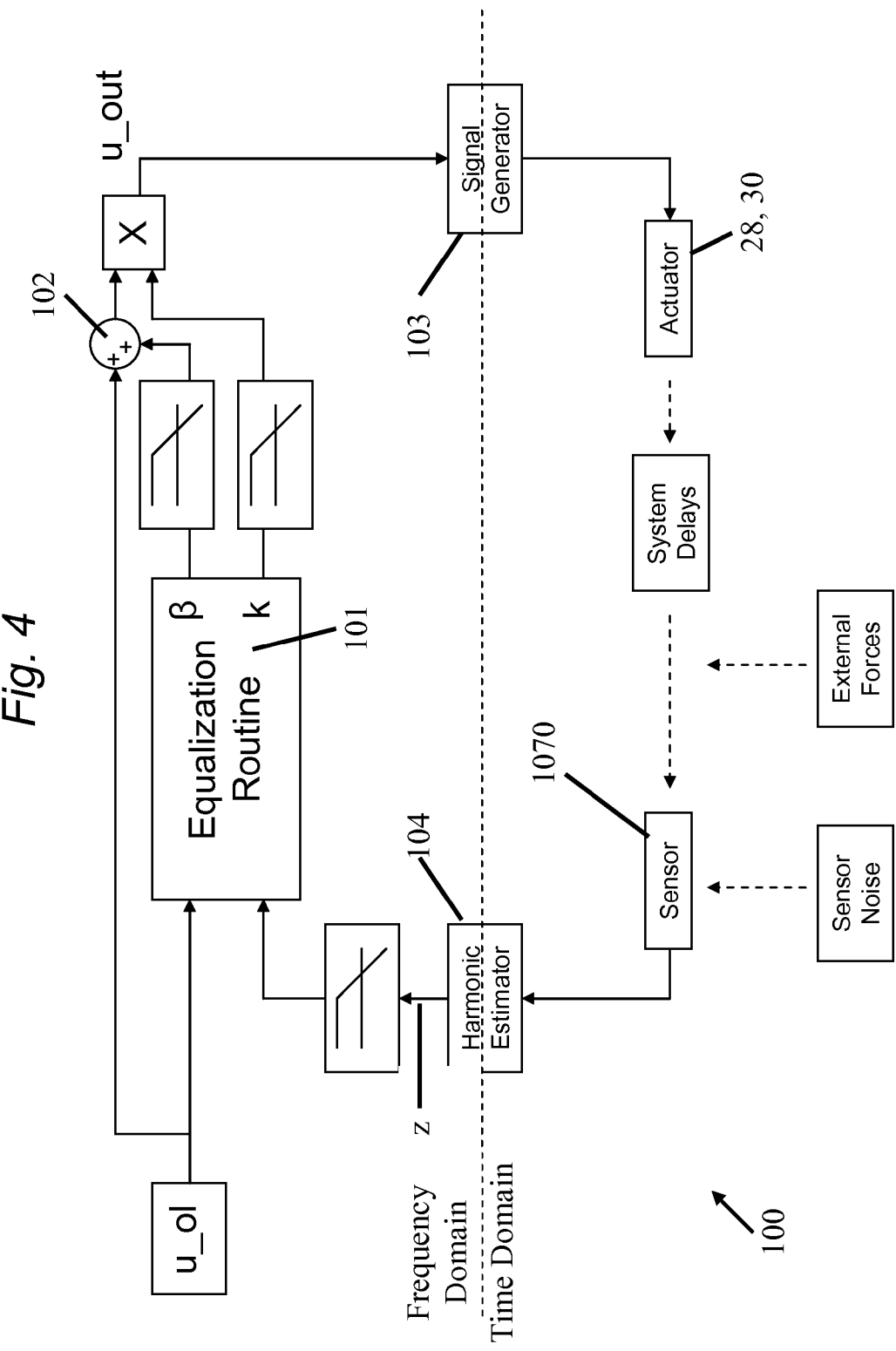
FIG. 4 is a schematic diagram of a control system for controlling actuators coupled to the flaps of FIGS. 3A, 3B and 3C.

In conventional rotorcraft control systems, primary and secondary actuators used time based analog controllers at only low frequencies relative to the rotor revolution speeds. The controls were often only configured to send out 1 cycle per revolution and it was observed that the actuators frequently responded to such instruction in an off-phase manner with a performance less than desired and waveforms that did not match the ideal sine wave shapes as commanded. With reference to FIG. 4, however, an implementation of a Kalman filter or a similar type of filter in an active rotor feedback controller 100 may be used to estimate and account for sensitivity between an open loop command, u_ol, which may be issued to any one of the primary actuators 28 and/or the secondary actuators 30, and a sensor reading of the actuator response in the presence of external forcing in order to generate a modified output command, u_out, to be actually issued to the primary actuators 28 and/or the secondary actuators 30. In this way, differences between commanded and actual actuator response due to actuator inaccuracies, sensor sensitive responses to external forces and noise can be reduced.

As shown in FIG. 4, the open loop command, u_ol, is inputted into the controller 100 and summed at a first summation point 102 with values, β and k, which are outputs from a Kalman filter 101 or a similar device through low pass filters, and which are representative of sensor sensitivity to external disturbances in vector form and the inverse of the linear sensor sensitivity to actuator commands in matrix form with a known lag and amplitude difference, respectively. The output of the summation is a signal representing the modified output command, u_out. This signal is further sequentially issued to a signal generator 103 and the one or more of the primary actuators 28 and/or the secondary actuators 30, which excites sensor 1070 with an actuator response due to the modified output command, u_out, along with any externally created response (i.e., sensor noise and external forces). Here, the open loop command, u_ol, refers to the unmodified command received by the routine and does not preclude it from coming from either a fixed commanded signal or from another controller.

The harmonic sensor response signal, z, is therefore a signal that is representative of the actual response of the primary actuators 28 and/or the secondary actuators 30 to the modified output command, u_out, and is generated by sensor 1070 and the harmonic estimator 104. Sensor 1070 is operably coupled to the one or more of the primary actuators 28 and/or the secondary actuators 30 and thereby senses their response to the modified output command, u_out, along with external disturbances and any signal noise associated with the type of sensor being used. The sensor 1070 then issues a signal that is representative of all actuator responses with the signal subsequently being passed through harmonic transformation in the harmonic estimator 104 to create the harmonic sensor response signal, z, in accordance with results of the sensing. The sensor 1070 may be any sensor capable of sensing actuator responses to commands issued thereto.

The harmonic sensor response signal, z, is then output from the harmonic estimator 104, which borders the time and frequency domains, and issued to a low pass filter. The output from the low pass filter is output to the Kalman filter 101 from which the values β and k are derived.

Due to the harmonic nature of the active rotor feedback controller 100, it is a fair assumption to relate the harmonic commanded actuator output, referred to above as the modified output command, u_out, to the harmonic sensor response signal, z, provided by the sensor 1070, which is operatively coupled to one or more of the primary actuators 28 and/or the secondary actuators 30, as described above, in accordance with equation 1 in which:

$$z = Su_{output} + b + v \quad \text{Equation 1:}$$

where z is the harmonic sensor response signal, as described above, in vector form, S represents a linear sensor sensitivity of sensor 1070 to actuator commands in matrix form, u_output is the command issued in vector form to the one or more of the primary actuators 28 and/or the secondary actuators 30 as the modified output command, u_out, b represents a sensor sensitivity of the sensor 1070 to external disturbances in vector form and v represents a Gaussian sensor noise vector of the sensor 1070. It is assumed that a linear time invariant (LTI) system is represented and that one unit of an actuator command is equivalent to one unit of sensor response. The variables represent matrices and vectors that include all harmonics of interest and the actuator sensitivity matrix is invertible.

A Kalman filter derivation results in the following state update formulas with added process uncertainty Q along with sensor variance R. The added process uncertainty allows the Kalman filter to remain nimble to process changes over time.

$$M = P^- + Q \quad \text{Equation 2:}$$

$$K = MH^T[HMH^T + R]^{-1} \quad \text{Equation 3:}$$

$$x^+ = x^- + K[z - Hx^-] \quad \text{Equation 4:}$$

$$P^+ = M - KHM \quad \text{Equation 5:}$$

Equations 2-5 assume the measurement model in the following equation 6 where z is the harmonic sensor response obtained from the sensor measurement, x is the estimated parameter, H is the transfer function matrix and v is a Gaussian uncertain measurement noise and that x and v are independent.

$$z = Hx + v \quad \text{Equation 6:}$$

Equation 1 can be cast in the form of equation 6 by defining the following parameters, where n is the number of harmonics of interest.

$$H = \begin{bmatrix} u_{output_{n \times 1}} & \cdots & 0 \\ \vdots & \ddots & \vdots & I_{n \times n} \\ 0 & \cdots & u_{output_{n \times 1}} \end{bmatrix} \quad \text{Equation 7}$$

$$x_{(n*n+n) \times 1} = \begin{bmatrix} S_{11} \\ \vdots \\ S_{nn} \\ b_{n \times 1} \end{bmatrix} \quad \text{Equation 8}$$

This yields the final form for Kalman estimation seen in equation 9. Here matrix I includes an identity matrix of size n.

$$z = \begin{bmatrix} u_{output_{n \times 1}} & \cdots & 0 \\ \vdots & \ddots & \vdots & I_{n \times n} \\ 0 & \cdots & u_{output_{n \times 1}} \end{bmatrix} \begin{bmatrix} S_{11} \\ \vdots \\ S_{nn} \\ b_{n \times 1} \end{bmatrix} + v \quad \text{Equation 9}$$

With these estimated values, the output signal for actuator equalization can be modified to be of the following form, so that z=u_ol in steady state:

$$u_{output} = k(u_{open\ loop} - \beta) \quad \text{Equation 10:}$$

with k and β being output values of the low pass filters with $S^{-1}$ and b as their respective signals and with the low pass filter being used to smooth the transition from S=I and b=θ to their estimated values assuming that S is always invertible and θ is defined as a zeros vector. Q takes the form in equation 10 to prevent numerical drift and to correct for process uncertainty for instances of low u_ol.

$$Q = \begin{bmatrix} u_{openloop_1} > \text{threshold} & \cdots & 0 \\ \vdots & \ddots & \vdots \\ 0 & \cdots & u_{openloop_n} > \text{threshold} \end{bmatrix} \quad \text{Equation 11}$$

The values of the n u_ol vectors take up the diagonal of the matrix of equation 11, leaving the rest zero.

Implementation of the Kalman filter 101 of the controller 100 will reduce sensitivity differences and reject sensor noise while being robust to changes in external forces and sensitivities.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A rotorcraft control system, comprising:
 a rotor blade having a moving surface operatively connected for movement among various positions;
 an actuator receptive of a modified control signal and operatively connected to move the surface among the various positions;

a sensor operably coupled to the actuator to generate a sensor response signal reflective of a response of the actuator to the modified control signal; and a controller to output the modified control signal to the actuator, the controller including a control loop to generate the modified control signal from an initial control signal that is modified by relating the initial control signal and the sensor response signal and by accounting for actuator inaccuracies, sensor sensitivities and noise, wherein the controller comprises a Kalman filter that outputs for summation with the initial control signal an inverse value of a linear sensor sensitivity to actuator commands and a value of sensor sensitivity to external disturbances.

2. The rotorcraft control system according to claim 1, wherein the moving surface comprises at least one of a primary surface and a secondary surface.

3. The rotorcraft control system according to claim 1, wherein the actuator performs primary flight control.

4. The rotorcraft control system according to claim 1, wherein the actuator performs higher harmonic control and/or primary flight control.

5. The rotorcraft control system according to claim 1, wherein the actuator is at least one of a primary actuator and a secondary actuator.

6. The rotorcraft control system according to claim 1, wherein the controller accounts for sensor sensitivity to the actuator and external disturbances.

7. The rotorcraft control system according to claim 1, further comprising a harmonic estimator, which is receptive of the sensor response signal and configured to generate a harmonic sensor response signal to be outputted to the Kalman filter.

8. A rotorcraft control system, comprising:
a rotor blade having a moving surface operatively connected for movement among various positions;
an actuator receptive of a modified control signal and operatively connected to move the surface among the various positions;
a sensor operably coupled to the actuator to generate a signal reflective of a response of the actuator to the modified control signal;
a harmonic estimator, which is receptive of the signal reflective of the actuator response and configured to generate a harmonic sensor response signal accordingly; and
a controller to output the modified control signal to the actuator, the controller including a control loop to generate the modified control signal from an initial control signal that is modified by relating the initial control signal and the harmonic sensor response signal and by accounting for actuator inaccuracies, sensor sensitivities and noise, wherein the controller comprises a Kalman filter that outputs for summation with the initial control signal an inverse value of a linear sensor sensitivity to actuator commands and a value of sensor sensitivity to external disturbances.

9. The rotorcraft control system according to claim 8, wherein the moving surface comprises at least one of a primary surface and a secondary surface.

10. The rotorcraft control system according to claim 8, wherein the actuator performs primary flight control.

11. The rotorcraft control system according to claim 8, wherein the actuator performs higher harmonic control and/or primary flight control.

12. The rotorcraft control system according to claim 8, wherein the actuator is at least one of a primary actuator and a secondary actuator.

13. The rotorcraft control system according to claim 8, wherein the controller accounts for sensor sensitivity to the actuator and external disturbances.

14. The rotorcraft control system according to claim 8, wherein the harmonic estimator outputs the harmonic sensor response signal to the Kalman filter.

15. A method of operating a controller of a rotorcraft, the method comprising:
outputting at a Kalman filter a modified control signal to an actuator for moving a moving surface on a rotor blade;
sensing an actuator response to the modified control signal while accounting for actuator inaccuracies, sensor sensitivity to noise and external forces;
generating an actuator response signal from the sensed actuator response;
converting the actuator response signal into a harmonic sensor response signal; and
generating the modified control signal by modifying an initial control signal in accordance with values obtained from the harmonic sensor response signal,
the modifying comprising outputting for summation with the initial control signal an inverse value of a linear sensor sensitivity to actuator commands and a value of sensor sensitivity to external disturbances.

16. The method according to claim 15, further comprising inputting the initial control signal into the controller.

* * * * *